July 11, 1939.  H. CHAMBON  2,166,038
MANUFACTURE OF BOARD STRENGTHENED COVERINGS
Filed July 15, 1936  7 Sheets-Sheet 1
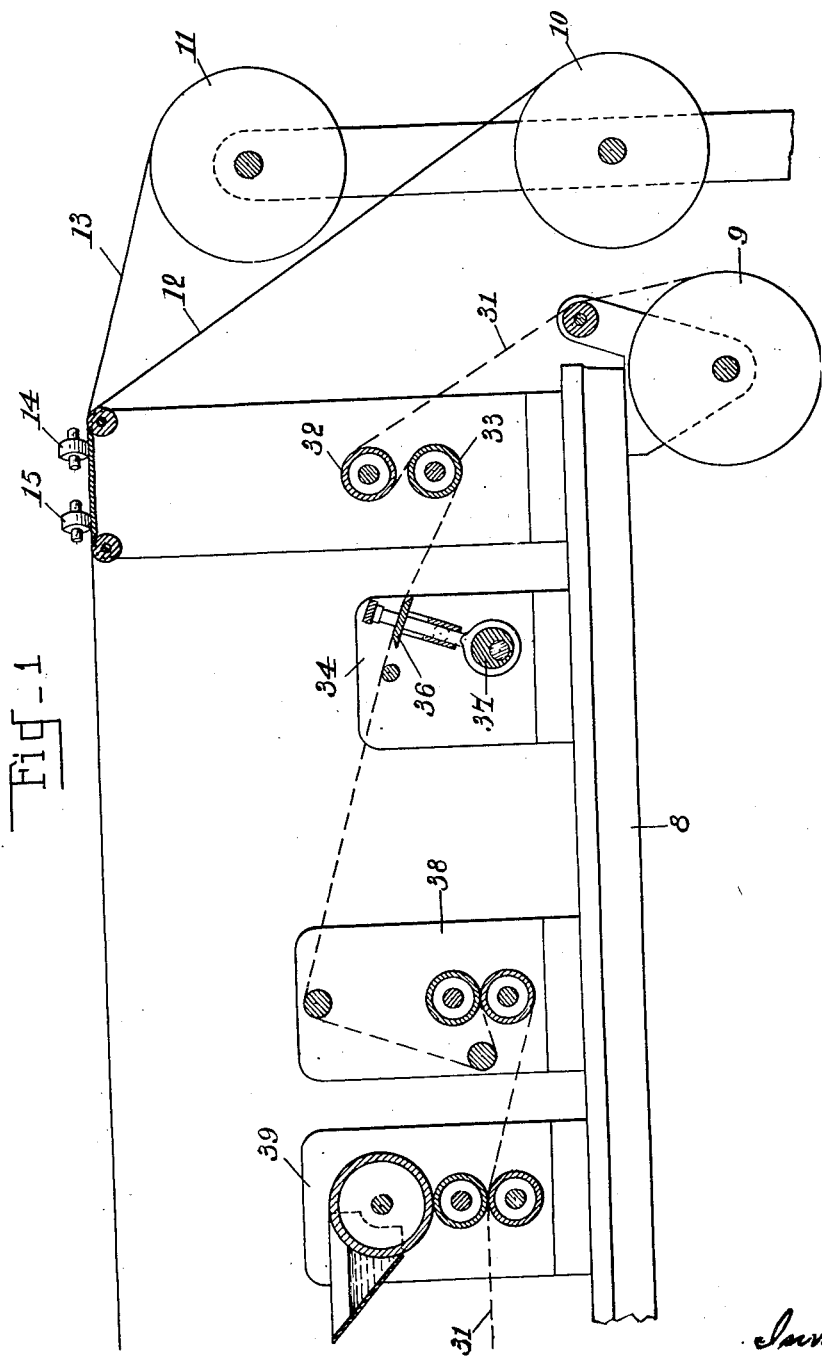

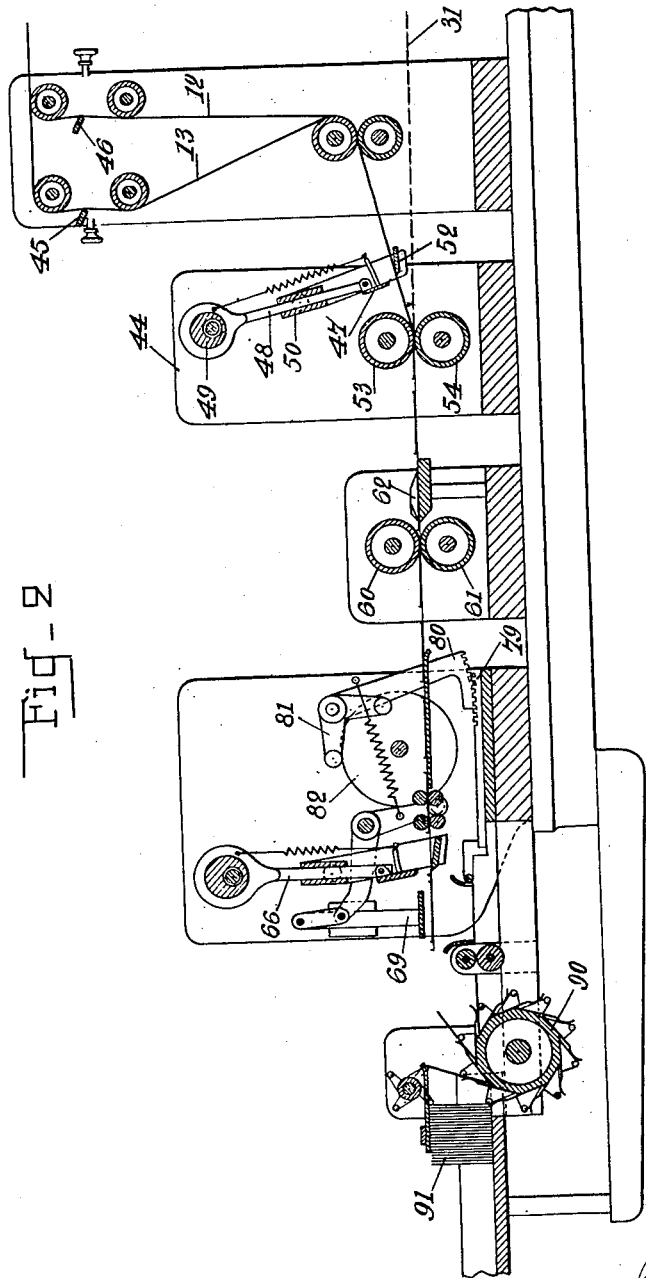

July 11, 1939.  H. CHAMBON  2,166,038
MANUFACTURE OF BOARD STRENGTHENED COVERINGS
Filed July 15, 1936    7 Sheets-Sheet 3
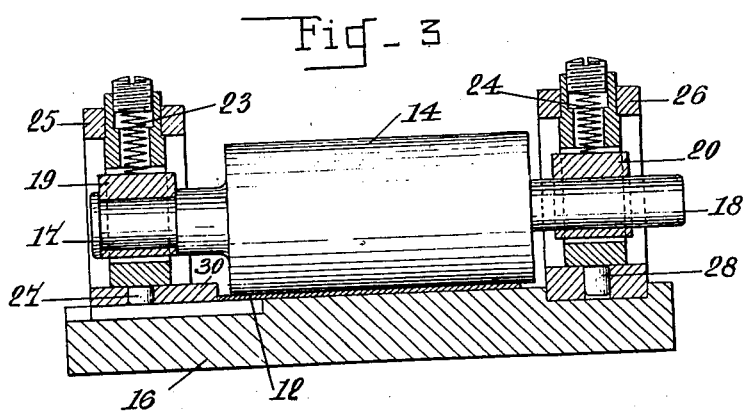
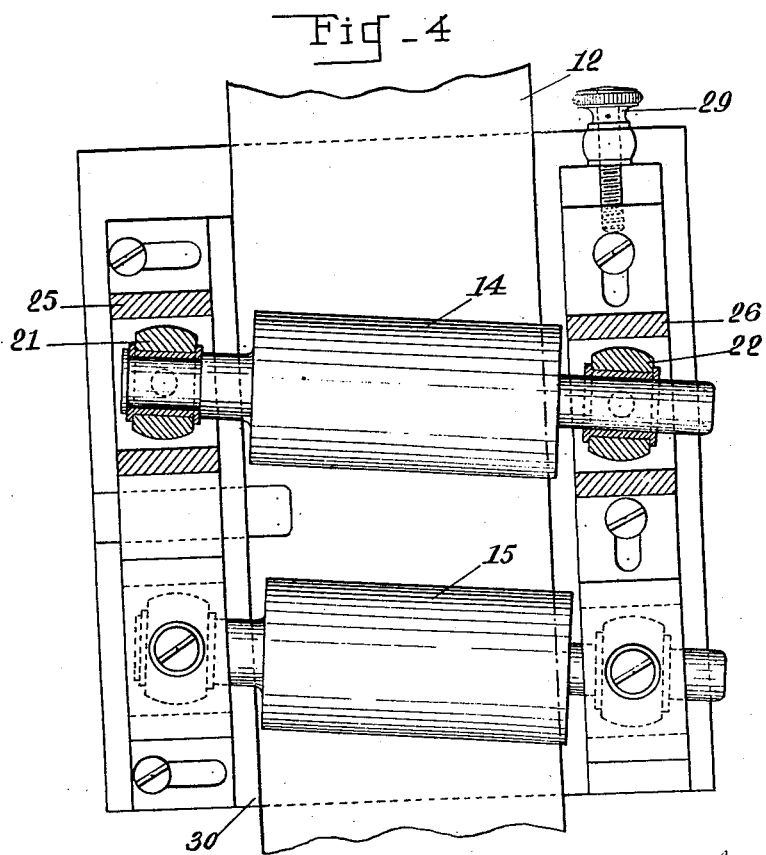

July 11, 1939.  H. CHAMBON  2,166,038
MANUFACTURE OF BOARD STRENGTHENED COVERINGS
Filed July 15, 1936   7 Sheets-Sheet 4
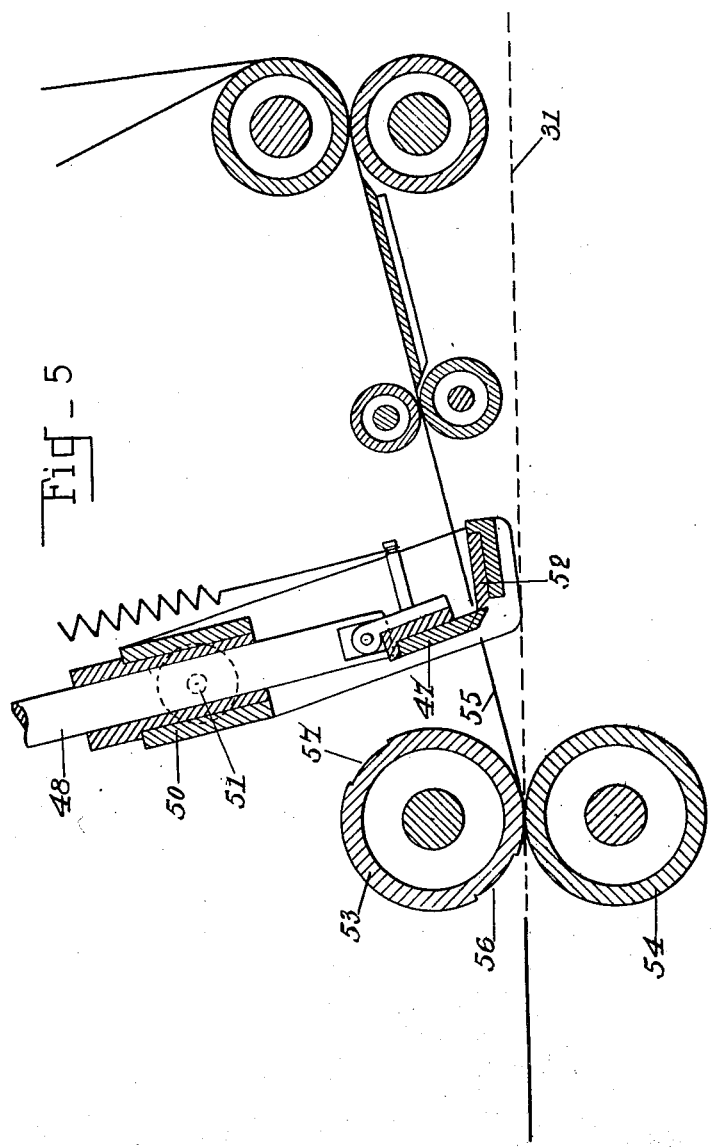

July 11, 1939.  H. CHAMBON  2,166,038
MANUFACTURE OF BOARD STRENGTHENED COVERINGS
Filed July 15, 1936  7 Sheets-Sheet 5
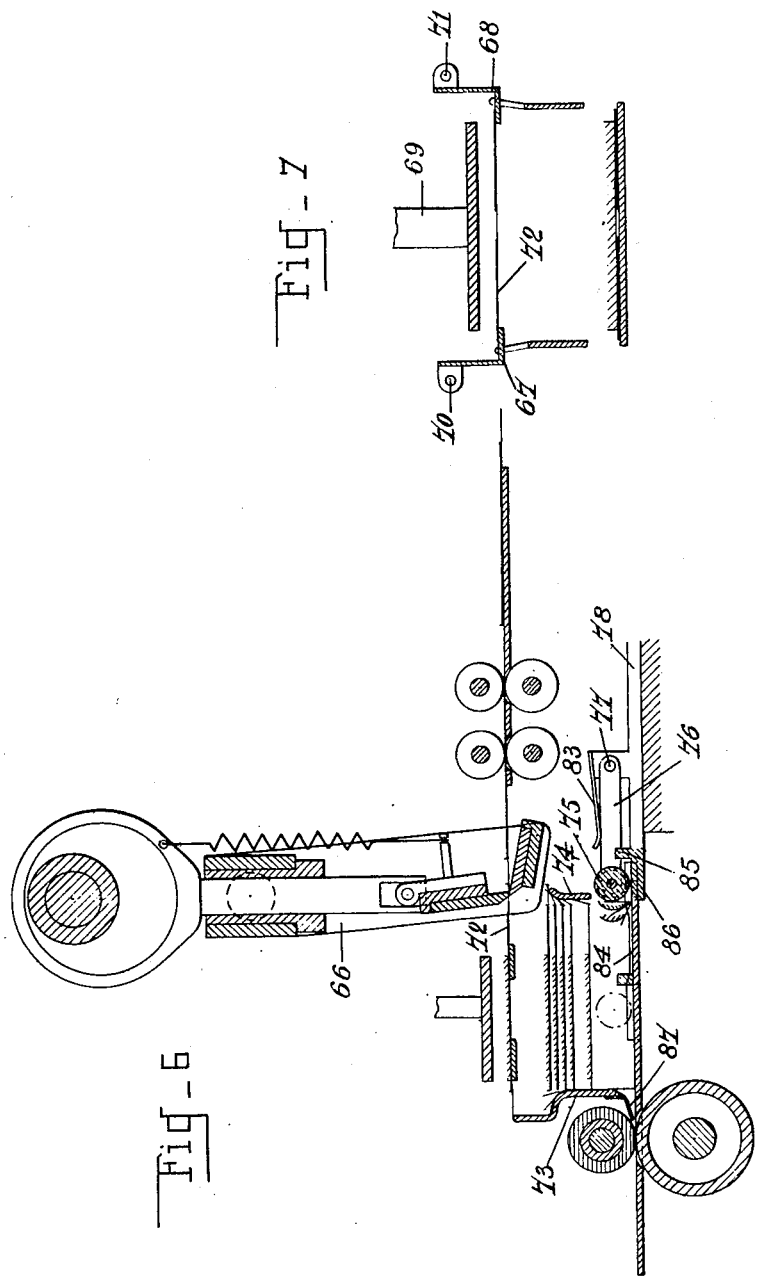

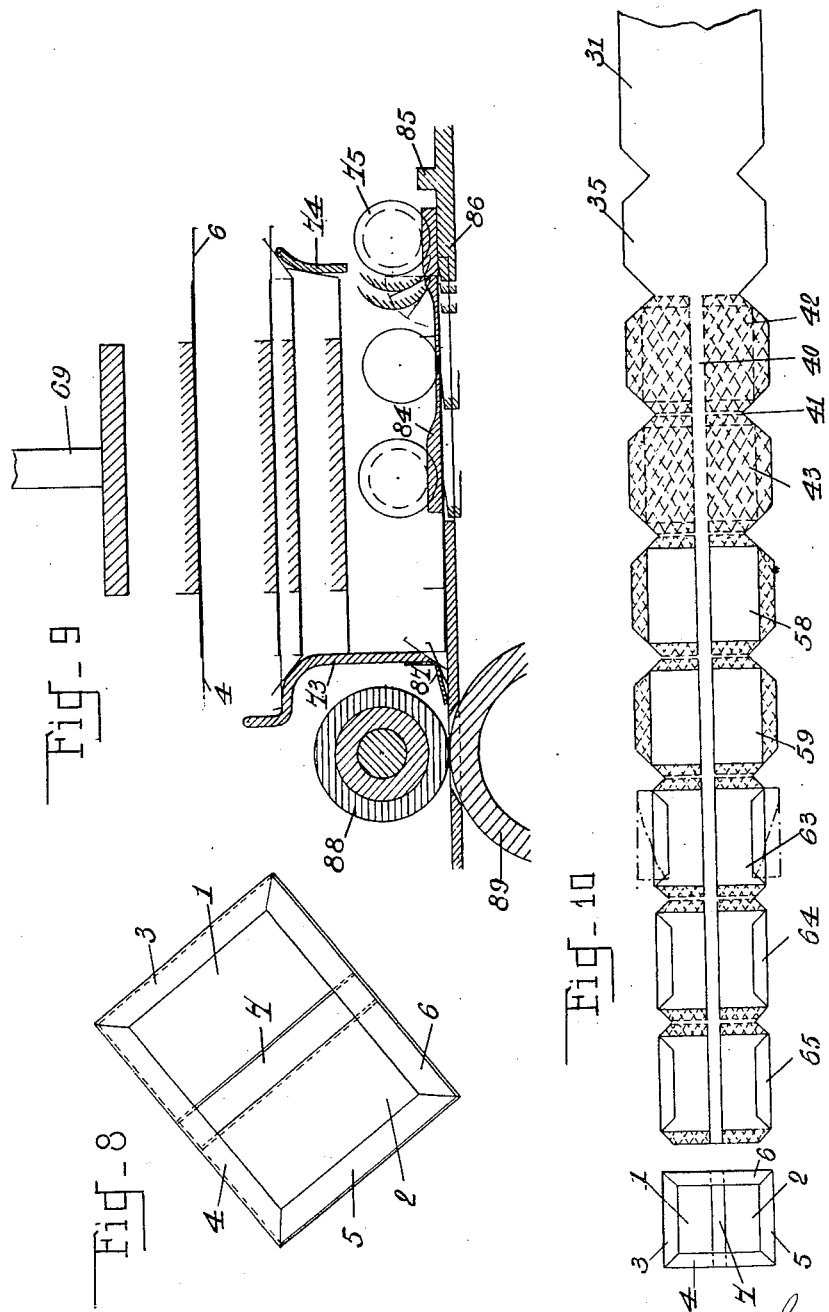

July 11, 1939.  H. CHAMBON  2,166,038
MANUFACTURE OF BOARD STRENGTHENED COVERINGS
Filed July 15, 1936  7 Sheets-Sheet 7
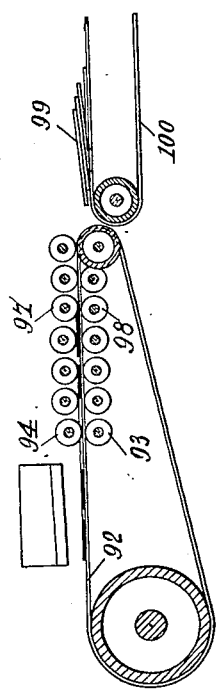
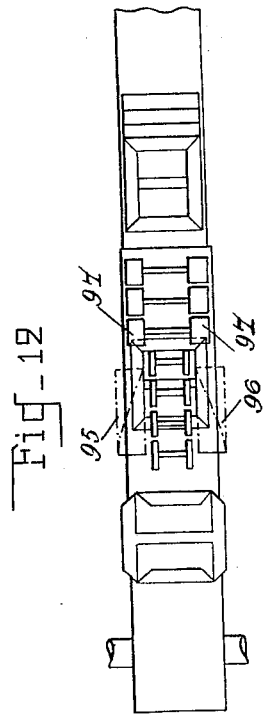
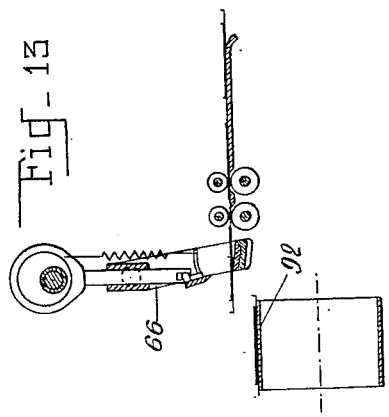
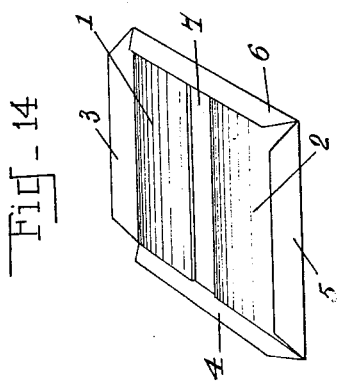
Inventor:
H. Chambon Patented July 11, 1939

2,166,038

UNITED STATES PATENT OFFICE 2,166,038

MANUFACTURE OF BOARD STRENGTHENED COVERINGS

Henri Chambon, Paris, France, assignor to Societe Anonyme des Anciens Etablissements L. Chambon, Paris, France Application July 15, 1936, Serial No. 90,782
In France July 29, 1935

12 Claims. (Cl. 154—2)

This invention relates to processes and apparatus for the manufacture of coverings, comprising portions formed of board or similar material which are secured to a support of flexible material such as paper.

One of the main features of the invention is to supply the paper in the form of a strip which is cut towards the end of the process. Said strip is continuously advanced and is brought successively to the various apparatuses which operate thereon without interfering with its feed. In this way the operations are very exactly performed and the tension exerted upon the strip has a constant value, so that the length of the strip between each apparatus is always identical and consequently the operations such as the coating with adhesive, cutting or the like are exactly performed at the right place.

In a preferred embodiment, the strip of paper is first cut by an oscillating cutting mechanism, then printed by a rotary printing machine and finally coated with adhesive and provided with board.

The position of the strips and particularly the position of the board will be advantageously adjusted by freely rotating cylinders arranged in angular relation to the direction of the strip. These are applied on said strip to urge it laterally against a fixed guide against which the edge of the strip bears. The strip will preferably pass successively under a plurality of cylinders. The cylinders may be supported in bearings which are vertically slidable and which may rotate about a vertical axis, and said bearings are adjustable in order to vary the angular setting of the cylinders.

The board may be fed preferably on the upper face of the strip which has previously been coated with adhesive and the board may be sectioned at this time. It is advantageous to provide cylinders for driving the board together with the paper and secure adhesiveness by pressing them together. Grooves may be provided on the surface of one of the cylinders in order to obtain feeding when desired. This feeding will preferably begin a little before the cutting of the board.

The side edges of the paper may then be folded over by means of fixed folders. The strip of paper may then be cut. Finally the transverse edges may be raised by depressing the blank in a folding box and the folding over of such edges may be accomplished by means of a roller moved toward the blank and controlled by a fixed cam.

In another embodiment, after being sectioned, the blanks may fall upon a transfer device and are thus carried under the folders and then between rollers which press the edges against the boards.

It is understood that the above arrangements and those which will further be described are jointly or separately considered as being protected by the present specification and claims.

By way of example and in order to facilitate an understanding of the invention an embodiment thereof is shown in the accompanying drawings in which:

Figure 1 is an elevational view with parts in section of the right hand side of a machine according to the invention.

Figure 2 is a similar view of the left hand side of the machine shown in Figure 1.

Figure 3 is a cross sectional view of the board aligning device.

Figure 4 is a plan view of the device shown in Figure 3.

Figure 5 is a cross sectional view on an enlarged scale of the board cutting mechanism.

Figure 6 is a cross sectional view showing the cutting and folding mechanism.

Figure 7 is a transverse cross sectional view of the folding device.

Figure 8 is a perspective view of the completed covering.

Figure 9 is a cross sectional view of the folding box on an enlarged scale.

Figure 10 is a diagrammatic plan view of the strip showing the successive steps of its manufacture.

Figure 11 is an elevational view with parts in section of a somewhat modified folding and securing device.

Figure 12 is a plan view of the device shown in Figure 11.

Figure 13 is an end view of the device shown in Figures 11 and 12.

Figure 14 is a perspective view of the covering with the edges upturned at right angles.

The board strengthened covering to be manufactured is shown in Figure 14 with its edges upturned at right angles in order to illustrate its arrangement and Figure 8 shows it completed. The covering is formed of two rectangular pieces of heavy board 1 and 2, secured in side by side spaced relationship on a sheet of paper having its overlapping edges 3, 4, 5 and 6, folded over and secured to the board. In Figure 14 the edges are shown upturned at right angles, whilst in Figure 8 they are folded down in their final position.

The boards 1 and 2 are subsequently folded on one another, thus forming a book whose back or binding is constituted by the paper at 7, in the spacing provided between both pieces of board.

The machine used comprises a bed plate 8 supporting the various devices. Referring to Figure 1, 9 is the reel of paper and 10 and 11, two reels of board. The reels 10 and 11 are slightly offset, so that the strips 12 and 13, which are being unrolled, will follow parallel paths, slightly spaced the one from the other.

A number of aligning devices secure the correct positioning of both strips of board. They are diagrammatically shown at 14 and 15, in Figure 1 and one of them is more completely illustrated in Figures 3 and 4. It comprises a base 16 above which are supported two freely rotatable cylinders 14 and 15. The cylinders are provided at their ends with journals 17 and 18, supported in the bearings 19 and 20. The bearings are vertically displaceable in the frames 21 and 22 and are urged downwardly by the springs 23 and 24. The frames 21 and 22, are arranged in the supports 25 and 26, by means of pivots 27 and 28, which provide for the rotation of the frames about a vertical axis.

The support 25 is fixed whilst the support 26 is longitudinally slidable under the action of a screw 29. In this way the cylinders 14 and 15 may be set with an obliquity such as shown in Figure 4 and said oblique setting may be varied.

The strip of board 12 is guided between the base 16 and the cylinders 14 and 15 which exert a light pressure against its surface due to the action of the springs 23 and 24. The strip 12 drives the cylinders 14 and 15, and due to their obliquity the strip is urged against a fixed guide 30, shown at the left in Figures 3 and 4. In this way, the right position of the board is secured, since its edge is always in contact with the fixed guide 30. The other strip of board 13, is guided in a similar device which has not been shown.

On the other hand, the strip of paper 31, fed from the reel 9, is guided on the driving cylinders 32 and 33. Subsequently a cutting mechanism 34 punches out triangular pieces in the edges of the strip and the strip is thus cut out as shown at 35 in Figure 10. The said cutting mechanism comprises an oscillating punching member 36, driven by an eccentric part 37, in order to follow the motion of the strip 31 during the operation.

The strip is then fed to a printing device 38 for printing any suitable matter on the paper. Then it comes to an adhesive applying device 39 which coats with adhesive the upper face of the strip except an axial stripe 40 (Figure 10) and a narrower stripe 41 which joins the apexes of the triangles which have previously been cut.

Figure 10 shows at 42 and 43 two elements of the strip in this stage of its manufacture. The axial stripe 40 will form the back or binding of the book, whilst the narrow stripes 41 indicate the places at which the strip will be subsequently severed.

The strip of paper 31 then comes to the cutting mechanism whose frame is shown at 44 in Figure 2. On the other hand the strips of board 12 and 13, pass over the straightening blades 45 and 46 and subsequently come to the cutting mechanism 44.

The said mechanism is of the oscillating type i. e., its cutter 47 (Figures 2 and 5) is secured at the end of a connecting rod 48, which under the action of the eccentric 49, slides in a guide 50 oscillatable about an axis 51. Owing to such device, the cutter 47 and its cooperating element 52 follow the strip during each cutting operation, so that the constant speed of said strip is not interfered with.

The strip of paper 31 (Figure 5) is supplied horizontally and passes between two cylinders 53 and 54. On the upper face of said strip 31, which has been coated with adhesive, are applied the strips of board such as 55. The strips move forward freely during the major part of the cutting operation and to this end, the upper cylinder 53 is provided with recessed portions 56 and 57. A little before the end of the cutting operation, the nonrecessed periphery of the cylinder 53 comes in front of the cylinder 54 and grasps both paper and board. In this way the forward motion is secured without any traction resulting from any small difference in velocity between paper and board. Furthermore, under the action of pressure, the board is secured to the paper and then the now composite strip takes the form shown at 58 and 59, in Figure 10.

The strip is subsequently fed by the cylinders 60 and 61, which guide it under the fixed folding members 62. These members fold down the longitudinal edges 3 and 5, upon the boards 1 and 2, as shown at 63 in Figure 10, thus obtaining the blanks shown at 64 and 65. A continuous strip is now obtained which is provided with pieces of board in spaced relation and with bordered longitudinal edges.

Such strip is then advanced to a cutting mechanism 66 similar to the mechanism shown in Figure 5, i. e., of the oscillating type. This mechanism cuts the strip of paper whilst following its constant forward motion. The strip is cut along the narrow stripe which has not been coated with adhesive and which is shown at 41 on the right hand side of Figure 10.

After being cut, the blank 72 is supported on the pivoted angle members 67 and 68, (Figure 7) which support it until the piston 69 is moved downwardly. At this time the members 67 and 68, pivot away from the blank about their axes 70 and 71, and the piston 69 forces the blank 72 down in a folding box. The transverse edges 4 and 6, of the paper are then raised at right angles by the lateral walls 73 and 74; of the folding box, as may be seen in Figures 6 and 9 which show the successive positions of the same blank.

The folding down of the right edge 6 upon the board is obtained by a moving cylinder 75 (Figures 6 and 9). This cylinder is attached to the end of a lever arm 76 pivoted at 77 to a slide bar 78. The slide bar is provided with a rack 79 (Figure 2) driven by a toothed sector 80, a lever 81 and a cam 82. The lever arm 76 is urged downwardly by a spring 83, but its motion is controlled by a fixed track member 84 on which a roller of smaller diameter provided at the end of the cylinder rolls 75. The slide bar 78 is further provided at its left end with a stop 85 and with an extension 86 which forms a moving plate.

The track element 84 is formed with a lower central portion and with two lateral higher portions. In this way, when the slide bar 78 slides from right to left, the cylinder 75 first moves away from the moving plate 86, then approaches it and finally is once more spaced from the plate at the end of its travel.

In this way the cylinder will fold down the edge 6 of the paper, then press it against the plate 86 and is finally moved away for returning backwards. The cylinder thus performs the folding down and securing of the edge 6. Towards the end of said motion the stop 85 meets the edge of the blank and urges it towards the left of Figure 6. Consequently, the blank comes out of the folding box through an aperture provided at the base of the wall 73 and the edge 4 of the paper is thus folded down by a blade 87 and secured during its passage between the rollers 88 and 89. The said rollers feed the covering which is then completed and in the form shown at the left end of Figure 10. The covering is then fed between the teeth of a wheel 90 (Figure 2) which raises it vertically and stacks it in a box 91.

In the embodiment of Figures 11, 12, and 13, the blanks are severed from the strip by the above described mechanism 66. They then fall upon an endless band 92 so that they travel in a direction at right angles to the direction of the strip in a horizontal plane. The blanks are thus carried between rollers such as 93 and 94, which feed them under the fixed inclined folders 95 and 96, shown in dot and dash lines in Figure 12. The folders 95 fold down the edges of the blank, as previously explained and such edges are adhesively secured during the travel between the rollers 97 and 98, which press the edges after their folding. Finally the completed coverings are piled at 99 on another conveyor 100 which travels slower than the first one.

Having now particularly described and ascertained the nature of my invention and in what manner the same is to be performed, I declare that what I claim is:

1. A machine for manufacturing cardboard covers from strips of cardboard and paper comprising means for applying the cardboard upon a paper strip, means for cutting the cardboard into separated elements, said last named means being disposed before the means for applying along the path followed by the cardboard at a distance less than the length of said cut-off elements in such manner that said cardboard element is applied at one of its ends upon the strip of paper while the other end is still connected to the strip of cardboard, means for applying adhesive to the strip of paper located in advance of the means for applying, and means for cutting said strip of paper covering said cardboard elements to predetermined lengths of sheets.

2. A machine according to claim 1 in which said means for cutting said cardboard comprises a cutting member and a guide for said member, said cutting member being displaced parallel to said strip of cardboard and at substantially the same speed.

3. A machine as set forth in claim 1 in which said means for applying the cardboard elements upon the strip of paper comprises two cooperating rollers and one of said rollers having notches therein.

4. A machine as set forth in claim 1 in which said means for cutting said cardboard comprises a cutting member, a guide for said member, said cutting member being displaced parallel to said strip of cardboard and at substantially the same speed, and means for aligning said strip of cardboard.

5. A machine as set forth in claim 1 in which said means for cutting said cardboard comprises a cutting member, a guide for said member, said cutting member being displaced parallel to said strip of cardboard and at substantially the same speed, and in which rollers are provided for feeding the cardboard and the axes of said rollers are inclined to the longitudinal axis of the cardboard strip.

6. A machine as set forth in claim 1 in which said means for cutting said cardboard comprises a cutting member, a guide for said member, said cutting member displaced parallel to said strip of cardboard and at substantially the same speed and in which rollers are provided for feeding the cardboard strip, the axes of said rollers being inclined to the longitudinal axis of said cardboard strip, bearings for said rollers and pivoted elements supporting said bearing.

7. A machine as set forth in claim 1 in which said means for cutting said cardboard comprises a cutting member, a guide for said member, said cutting member displaced parallel to said strip of cardboard and at substantially the same speed and in which rollers are provided for feeding said cardboard strips, the axes of said rollers being inclined to the longitudinal axis of said cardboard strip, and lateral guides against which said cardboard strip is pressed.

8. A machine as set forth in claim 1 in which means are provided for straightening the cardboard strip and said straightening means is located in advance of the cutting means.

9. A machine as set forth in claim 1 wherein fixed inclines are provided located at the side of the paper strip after said means for applying but along the trajectory of the edges of said paper strip in order to fold said edges upon said cardboard elements.

10. A machine as set forth in claim 1 wherein fixed inclines are provided located at the side of said paper strip after said means for applying but along the trajectory of the edges of said paper strip in order to fold said edges upon said cardboard elements, and means for feeding said strip of paper located behind said fixed inclines.

11. A machine according to claim 1 in which said cutting means are located behind said means for applying, said cutting means comprising a cutting member and a guide for said member, said cutting member being displaced parallel to said cardboard strip and substantially at the same speed as said cardboard strip.

12. A machine according to claim 1 in which a plurality of strips of cardboard are provided and in which means are provided for maintaining said strips of cardboard in predetermined spaced relation.

HENRI CHAMBON.